United States Patent [19]

Milby et al.

[11] Patent Number: 4,918,329

[45] Date of Patent: Apr. 17, 1990

[54] DATA TRANSMISSION SYSTEM

[75] Inventors: Gregory H. Milby, San Diego; Ikuo J. Sanwo, San Marcos, both of Calif.

[73] Assignee: NCR Corporation, Dayton, Ohio

[21] Appl. No.: 224,023

[22] Filed: Jul. 25, 1988

[51] Int. Cl.[4] ..................... H03K 19/17; H03K 19/96; G06F 13/00; G11C 15/49

[52] U.S. Cl. ..................... 307/241; 307/443; 370/99; 370/85.9; 364/200; 365/189.01

[58] Field of Search ............... 307/475, 465, 466, 467, 307/468, 469, 443, 240, 241, 242, 296.1, 450, 296.6; 364/200, 900; 365/203, 205, 189.1, 189.2; 370/99, 85

[56] References Cited

U.S. PATENT DOCUMENTS

| | | | |
|---|---|---|---|
| 4,154,978 | 5/1979 | Tu ..................... | 178/71 R |
| 4,404,474 | 9/1983 | Dingwall ..................... | 307/260 |
| 4,486,753 | 12/1984 | Saeki et al. ..................... | 340/825.91 |
| 4,488,066 | 12/1984 | Shoji ..................... | 307/443 |
| 4,500,988 | 2/1985 | Bennett et al. ..................... | 370/85 |
| 4,516,199 | 5/1985 | Frieder et al. ..................... | 364/200 |
| 4,527,237 | 7/1985 | Frieder et al. ..................... | 364/200 |
| 4,609,836 | 9/1986 | Koike ..................... | 307/451 |
| 4,621,202 | 11/1986 | Pumo ..................... | 307/241 |
| 4,645,944 | 2/1987 | Uya ..................... | 307/243 |
| 4,656,626 | 4/1987 | Yudichak et al. ............... | 370/99 X |
| 4,672,587 | 6/1987 | Geiger et al. ..................... | 365/189.1 |

Primary Examiner—Stanley D. Miller
Assistant Examiner—David R. Bertelson
Attorney, Agent, or Firm—Wilbert Hawk, Jr.; Stephen F. Jewett; Douglas S. Foote

[57] ABSTRACT

A data transmission system for transferring data signals between first and second buses is disclosed. The system includes means attached to the buses for the transfer of data signals to the buses and supply means connected to the buses for precharging the buses to a first voltage level. The system also includes circuit means connecting the buses and responsive to a data signal at a second voltage level on either of said buses for transferring the signal to the other bus.

33 Claims, 4 Drawing Sheets

DATA TRANSMISSION SYSTEM

The present invention relates to data transmission circuits and, more particularly, to a circuit for the bidirectional transfer of data from one data bus to another.

BACKGROUND OF THE INVENTION

In order to communicate between one part of a computer and another, parallel conductors are grouped together to form what is commonly known as a "bus". Each conductor carries a single bit of information which is represented by a high or low voltage. Buses are utilized on both macro and micro levels. For example, on a macro level a system bus might interconnect discrete systems such as peripheral devices. On a micro level buses are formed directly on an integrated circuit chip for interconnecting a multitude of arithmetic, logic, and memory type devices.

The present invention finds particular utility on the micro level as for example in very large scale integrated (VLSI) circuits. Increasingly, the size of individual components in VLSI circuits are shrinking. This allows for increased numbers of components and functions on a given chip. However, this also requires the buses to have more interface connections and generally makes the buses longer. Long, heavily interfaced buses are high in parasitic capacitance. One problem which this creates is the need for larger drivers to transmit information or data over the bus. Large drivers are undesirable because of wasted chip space and excessive power requirements. A second problem is the concomitant requirement for larger (wider) buses in order to handle the increased current from larger drivers. Wide buses are undesirable because they waste chip space.

OBJECTS OF THE INVENTION

It is therefor an object of the present invention to provide a new and improved circuit design for reduced bus size.

It is another object of the present invention to provide a new and improved design for an integrated circuit which reduces the size of drivers needed to transfer data to a bus.

It is yet another object of the present invention to provide a new and improved system for transmitting data from one bus to another.

SUMMARY OF THE INVENTION

The present invention is a data transmission system comprising first and second buses and first and second means attached to respective buses for the transfer of data signals to the buses. The system also comprises supply means connected to the buses for precharging the buses to a first voltage level and circuit means connecting the buses and responsive to a data signal at a second voltage level on either of said buses for transferring the signal to the other bus.

DETAIL DESCRIPTION OF THE INVENTION

Figure 1:
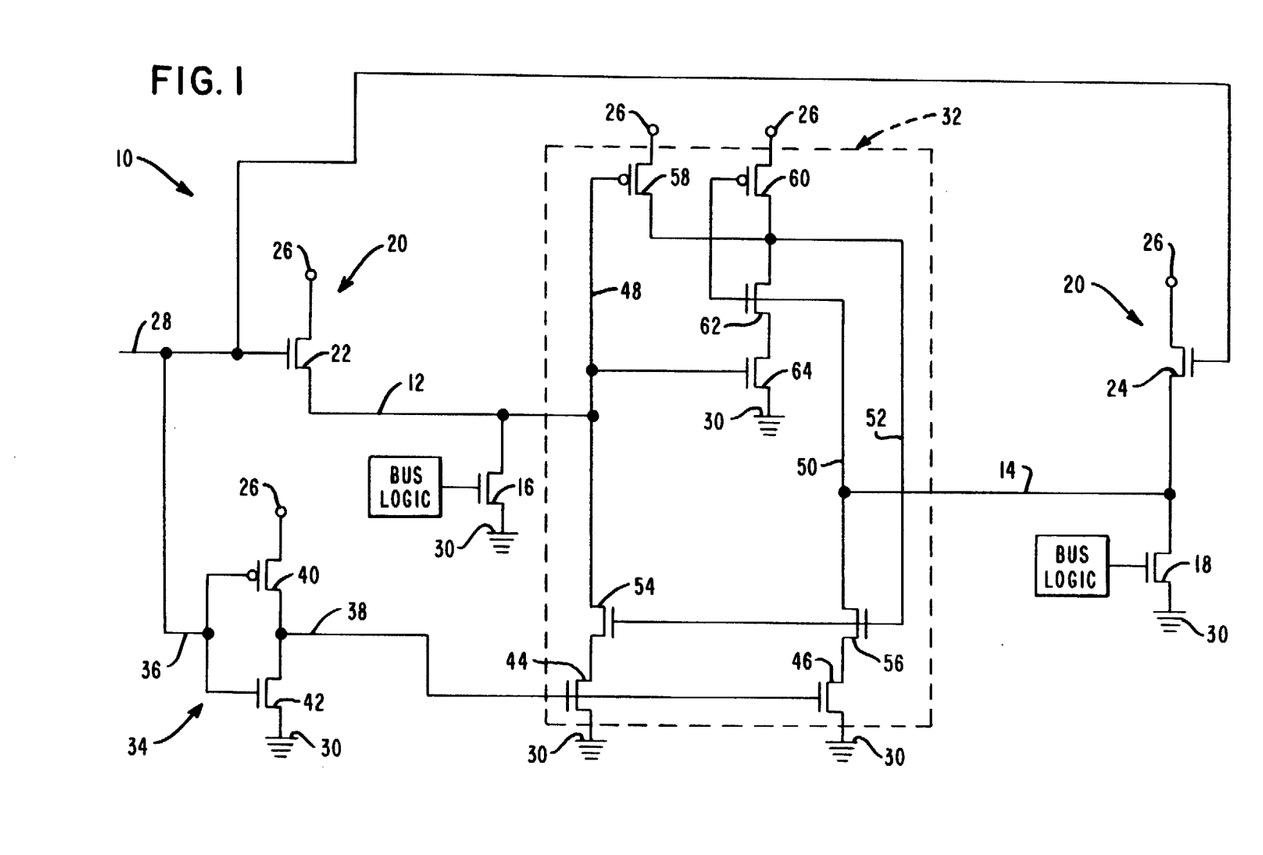
FIG. 1 is a circuit diagram of a data transmission system according to one form of the present invention.

FIG. 1 shows a circuit diagram of a data transmission system 10 according to one form of the present invention. Data buses 12 and 14 have NMOS field effect transistors 16 and 18, respectively, attached thereto for transfer of data signals to these buses. Each transistor 16 and 18 is connected to a power supply terminal 30 (shown as ground) and has some Bus Logic associated therewith which determines when a signal will be placed on the bus. It should be understood that the term "data" as used herein refers to any type of digital signal, and it specifically encompasses control, address, and data signals. It will be further understood that each bus 12 and 14 will normally have a receiver circuit (not shown) attached thereto for receiving the signals appearing on the buses.

In a prior art system data buses 12 and 14 would be an uninterrupted line. However, for the reasons discussed in the Background, dividing the bus as in the present invention provides reduced capacitance resulting in narrower bus lines.

Supply means 20, shown as NMOS field effect transistors 22 and 24 in the FIG. 1 embodiment, are connected between a power supply terminal 26 and buses 12 and 14, respectively. The gate of each transistor 22 and 24 is connected to control line 28 which receives a digital control signal (such as a clock signal) from a device (not shown). Transistors 22 and 24 respond to a "high" value of the control signal by switching on thereby connecting power supply terminal 26 to buses 12 and 14. In this manner, data buses 12 and 14 are precharged to essentially the voltage level of power supply terminals 26. Power supply terminals 26 and 30 are at potentials which represent the two logic levels appearing on data buses 12 and 14. Either one can be high relative to the other. However, in the preferred embodiment shown in FIG. 1, power supply 26 is high relative to power supply 30. Data buses 12 and 14 are thereby precharged to a logical high level. Precharging to such a high level is advantageous because the time required for transistor 16 or 18 to "pull" the bus line low is generally faster than the time it would take to pull the bus high.

Data transmission system 10 also includes circuit means 32 connecting buses 12 and 14. As will be described more fully hereinafter, circuit means 32 responds to a data signal on bus 12 or 14 at the voltage level provided by power supply terminal 30 and transfers the signal to the other bus. Circuit means 32 also responds to a "low" value of the control signal on control line 28. In this manner, when a "high" control signal appears on line 28 allowing supply means 20 to precharge data buses 12 and 14, circuit means 32 is in an "inactive" state. When a "low" control signal appears on line 28, circuit means 32 is placed in an "active" state and can detect and transmit to the other bus any new voltage level placed on one of the buses by NMOS transistors 16 or 18. With the alternate high/low voltage configuration of power supply terminals 26 and 30, respectively, supply means 20 and circuit means 32 can be configured so that buses 12 and 14 are precharged on a "low" control signal and circuit means 32 is active on a "high" control signal.

Data transmission system 10 further includes an inverter 34 having an input line 36 connected to control line 28 and an output line 38 connected to circuit means 32. Inverter 34 receives the control signal at input line 36 and provides a complementary control signal at output line 38. In the FIG. 1 embodiment, inverter 34 is a CMOS type inverter which includes PMOS field effect transistor 40 and NMOS field effect transistor 42 connected in series between power supply terminals 26 and 30. Output line 38 of inverter 34 is connected to the gates of NMOS field effect transistors 44 and 46. Transistors 44 and 46 connect circuit means 32 to power supply terminals 30.

Circuit means 32 includes a NAND gate having input lines 48 and 50 and an output line 52. Input line 48 is connected to data bus 12 and input line 50 is connected to data bus 14. Output line 52 is connected to the gates of NMOS field effect transistors 54 and 56. Transistor 54 is connected between data bus 12 and transistor 44, while transistor 56 is connected between data bus 14 and transistor 46.

The NAND gate also has PMOS field effect transistors 58 and 60 and NMOS field effect transistors 62 and 64. Transistor 58 is connected between power supply terminal 26 and the NAND gate output line 52 with its gate connected to data bus 12. Transistor 60 is connected between power supply terminal 26 and the NAND gate output line 52 with its gate connected to data bus 14. Transistors 62 and 64 are series connected between the NAND gate output line 52 and power supply terminal 30. The gate of transistor 62 is connected to data bus 14 and the gate of transistor 64 is connected to data bus 12.

In operation, data transmission system 10 receives a "high" control signal on control line 28 which will switch on transistors 22 and 24 allowing data buses 12 and 14 to be precharged through power supply terminals 26. During the precharge phase of operation, the "high" control signal on line 28 will be inverted to a "low" value by inverter 34. This "low" value will be less than the threshold voltage of transistor 44 or 46 thereby keeping circuit means 32 inactive.

When the control signal on line 28 goes "low", transistors 22 and 24 will switch off thereby isolating buses 12 and 14 from power supply terminal 26. At the same time, inverter 34 provides a "high" value at output line 38, which turns on transistors 44 and 46 thereby placing circuit means 32 in an active mode. During this period if the Bus Logic pulls either bus 12 or 14 "low" through NMOS transistor 16 or 18, circuit means 32 will immediately pull the other bus "low". For example, if NMOS transistor 16 pulls bus 12 "low", PMOS transistor 58 will turn on providing a "high" on output line 52. This "high" on output line 52 turns on transistors 54 and 56 thereby connecting both bus 12 and 14 to power supply terminal 30 which is "low". Similarly, if NMOS 18 pulls bus 14 "low", PMOS transistor 60 will turn on providing a "high" on output line 52 which again connects both bus 12 and 14 to power supply terminal 30.

Figure 2:
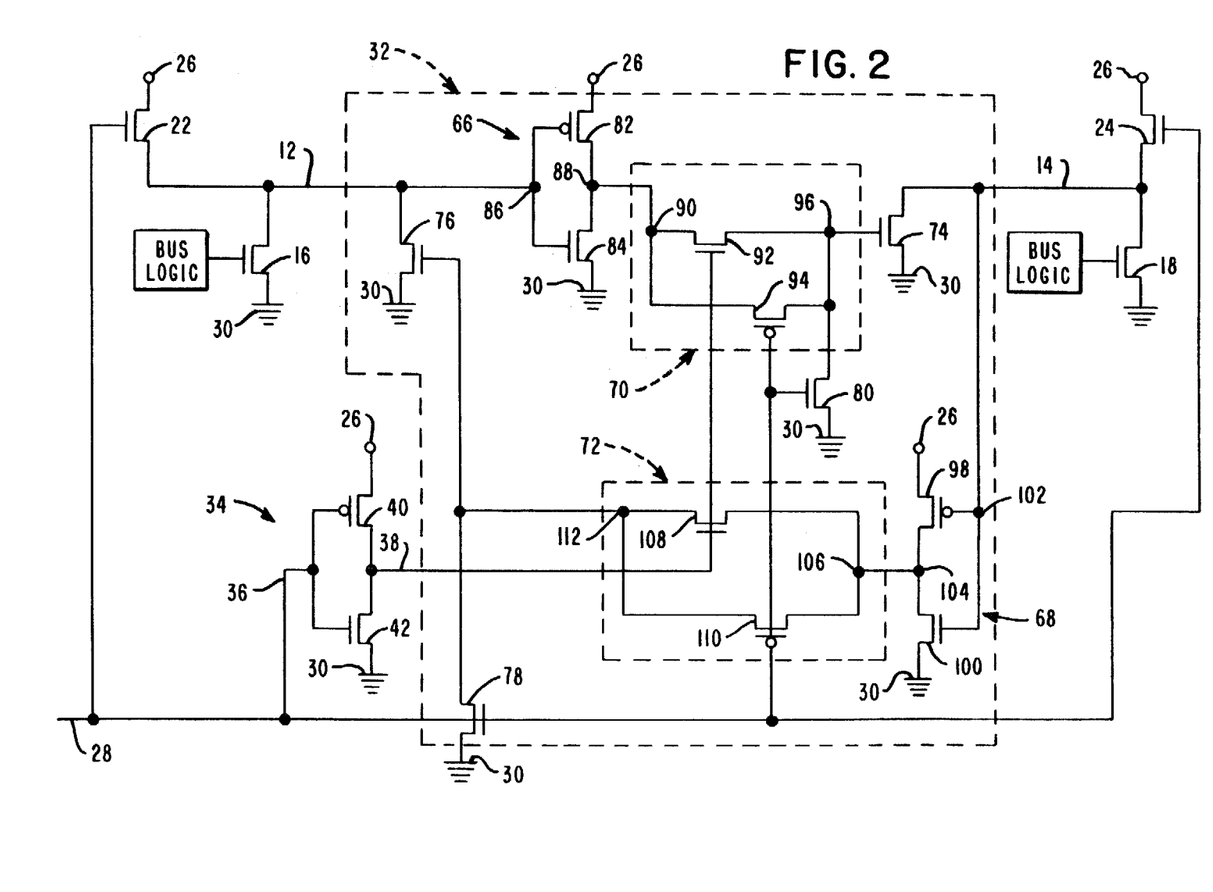
FIG. 2 is a circuit diagram of a data transmission system according to another form of the present invention.

FIG. 2 shows another embodiment of the present invention with like numbers representing similar elements to those described with reference to FIG. 1. The circuit means 32 comprises inverters 66 and 68, transfer gates 70 and 72, and NMOS field effect transistors 74, 76, 78 and 80.

Inverter 66 is a CMOS type inverter with PMOS field effect transistor 82 and NMOS field effect transistor 84 series connected between power supply terminals 26 and 30. Inverter 66 has an input 86 connected to data bus 12 and an output 88 connected to the input 90 of transfer gate 70. Transfer gate 70 is a PN channel combination gate having an NMOS field effect transistor 92 connected in parallel to a PMOS field effect transistor 94. The gate of transistor 92 is connected to the output line 38 of inverter 34 and receives a complementary control signal therefrom. The gate of transistor 94 is connected to control line 28 and receives a control signal therefrom. Transistor 74 is connected between data bus 14 and power supply terminal 30 with its gate connected to the output 96 of transfer gate 70. Transistor 80 is connected between output 96 of transfer gate 70 and power supply terminal 30.

Inverter 68 is a CMOS type inverter with PMOS field effect transistor 98 and NMOS field effect transistor 100 series connected between power supply terminals 26 and 30. Inverter 68 has an input 102 connected to data bus 14 and an output 104 connected to the input 106 of transfer gate 72. Transfer gate 72 is a PN channel combination gate having an NMOS field effect transistor 108 connected in parallel to a PMOS field effect transistor 110. The gate of transistor 108 is connected to the output line 38 of inverter 34 and receives a complementary control signal. The gate of transistor 110 is connected to control line 28 and receives a control signal. Transistor 76 is connected between data bus 12 and power supply terminal 30 with its gate connected to the output 112 of transfer gate 72. Transistor 78 is connected between output 112 of transfer gate 72 and power supply terminal 30.

In operation, data transmission system 10 shown in FIG. 2 will receive a "high" control signal on control line 28 which will switch on transistors 22 and 24 allowing data buses 12 and 14 to be precharged through power supply terminals 26. During the precharge phase of operation, the "high" control signal on line 28 will be received by the gate of transistors 78 and 80. This will pull outputs 112 and 96 of transfer gates 72 and 70, respectively, to a low value which prevents transistors 76 and 74 from conducting. The "high" signal on line 28 will also be received by the gates of PMOS transistors 110 and 94, and the "low" signal (complementary control signal) on output line 38 of inverter 34 will be received by the gates of NMOS transistors 108 and 92 preventing transfer gates 72 and 70 from conducting. Thus, circuit means 32 will remain inactive as long as the control signal on line 28 is "high".

When the control signal on line 28 goes "low", transistors 22 and 24 will switch off thereby isolating buses 12 and 14 from power supply terminal 26. Similarly, transistors 78 and 80 will switch off thereby isolating transfer gate outputs 112 and 96 from power supply terminal 30. At the same time, inverter 34 provides a "high" value at output line 38, which turns on transistors 108 and 92, and the "low" value on line 28 turns on transistors 110 and 94 thereby placing circuit means 32 in an active mode. During this period if the Bus Logic pulls either bus 12 or 14 "low" through NMOS transistor 16 or 18, respectively, circuit means 32 will immediately pull the other bus "low". For example, if NMOS transistor 16 pulls bus 12 "low", inverter 66 will provide a "high" at output 88. This "high" at output 88 passes through transfer gate 70 and turns on transistor 74 thereby connecting bus 14 to power supply terminal 30 which is "low". Similarly, if NMOS transistor 18 pulls bus 14 "low", inverter 68 will provide a "high" at output 104 which passes through transfer gate 72, turning on transistor 76, and connecting bus 12 to power supply terminal 30.

Figure 3:
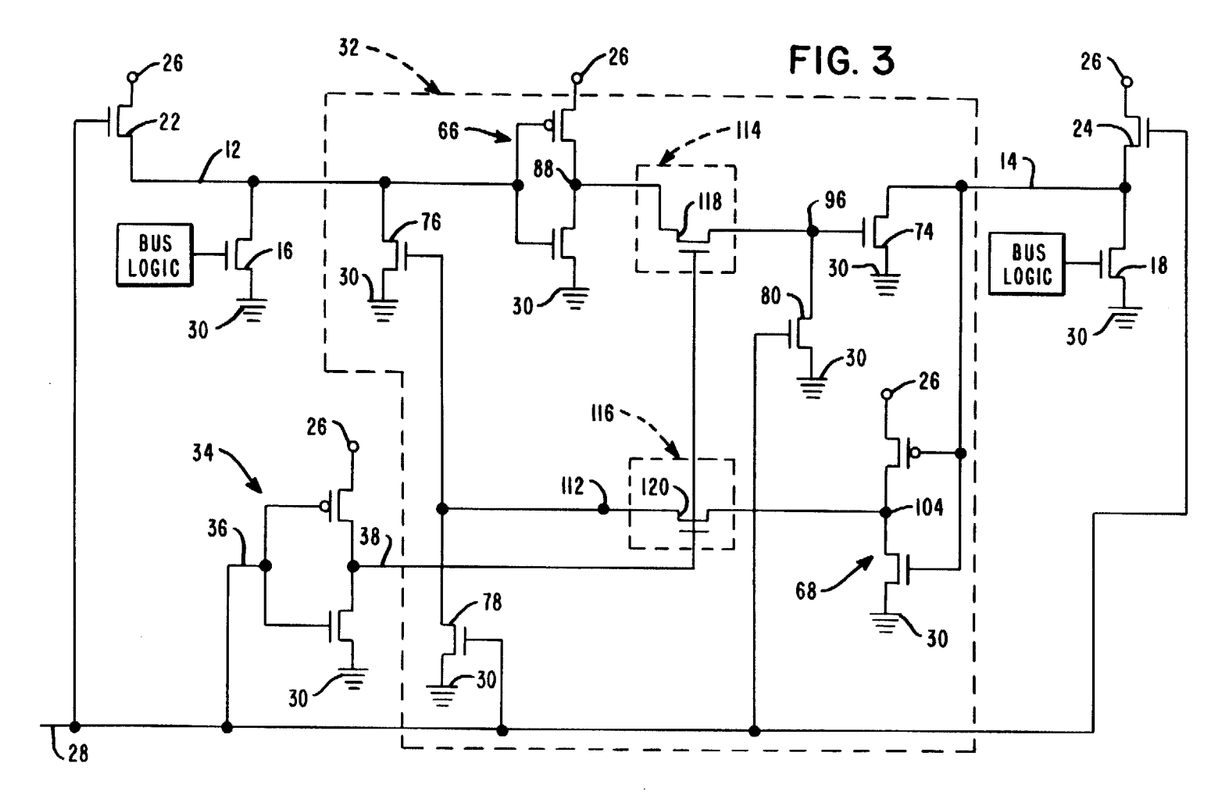
FIG. 3 is a circuit diagram of a data transmission system according to yet another form of the present invention.

FIG. 3 shows another embodiment of the present invention with like numbers representing similar elements to those described with reference to FIGS. 1 and 2. The circuit means 32 comprises inverters 66 and 68, transfer gates 114 and 116, and NMOS field effect transistors 74, 76, 78 and 80. Unlike the FIG. 2 embodiment which has PN channel transfer gates 70 and 72, the FIG. 3 embodiment has N channel transfer gates 114 and 116. More specifically, transfer gates 114 and 116 include NMOS field effect transistors 118 and 120, respectively. The gates of each transistor 118 and 120 are connected to output line 38 of inverter 34 and receive a complementary control signal therefrom.

In operation, data transmission system 10 shown in FIG. 3 will receive a "high" control signal on control line 28 which will switch on transistors 22 and 24 allowing data buses 12 and 14 to be precharged through power supply terminals 26. During the precharge phase of operation, the "high" control signal on line 28 will be received by the gate of transistors 78 and 80. This will pull outputs 112 and 96 of transfer gates 116 and 114, respectively, to a low value which prevents transistors 76 and 74 from conducting. The "low" signal (complementary control signal) on output line 38 of inverter 34 will be received by the gates of NMOS transistors 120 and 118 preventing transfer gates 116 and 118 from conducting. Thus, circuit means 32 will remain inactive as long as the control signal on line 28 is "high".

When the control signal on line 28 goes "low", transistors 22 and 24 will switch off thereby isolating buses 12 and 14 from power supply terminal 26. Similarly, transistors 78 and 80 will switch off thereby isolating transfer gate outputs 112 and 96 from power supply terminal 30. At the same time, inverter 34 provides a "high" value at output line 38, which turns on transistors 120 and 118 thereby placing circuit means 32 in an active mode. During this period if the Bus Logic pulls either bus 12 or 14 "low" through NMOS transistor 16 or 18, respectively, circuit means 32 will immediately pull the other bus "low". For example, if NMOS transistor 16 pulls bus 12 "low", inverter 66 will provide a "high" at output 88. This "high" at output 88 passes through transfer gate 114 and turns on transistor 74 thereby connecting bus 14 to power supply terminal 30 which is "low". Similarly, if NMOS transistor 18 pulls bus 14 "low", inverter 68 will provide a "high" at output 104 which passes through transfer gate 120, turning on transistor 76, and connecting bus 12 to power supply terminal 30.

Figure 4:
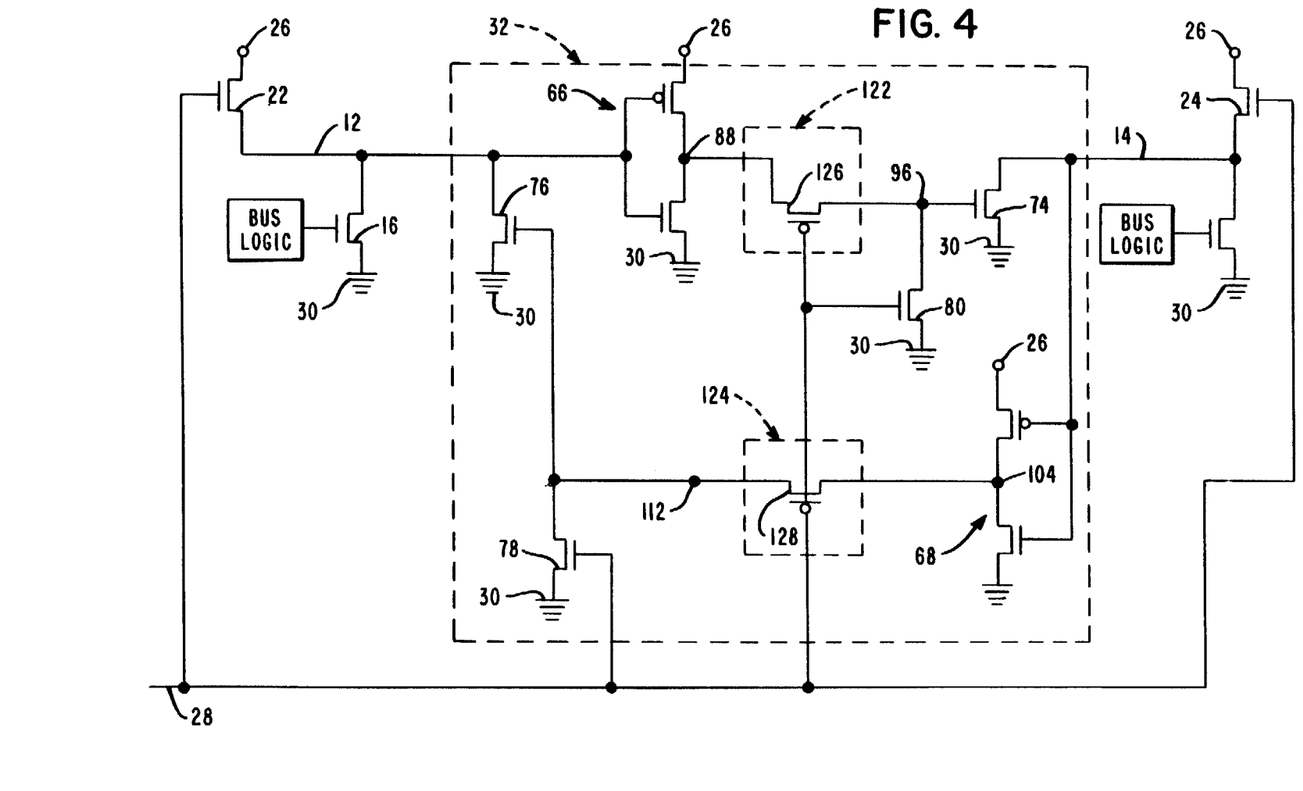
FIG. 4 is a circuit diagram of a data transmission system according to a further form of the present invention.

FIG. 4 shows another embodiment of the present invention with like numbers representing similar elements to those described with reference to FIGS. 1, 2 and 3. The circuit means 32 comprises inverters 66 and 68, transfer gates 122 and 124, and NMOS field effect transistors 74, 76, 78 and 80. Unlike the FIG. 2 embodiment which has PN channel transfer gates 70 and 72 and the FIG. 3 embodiment which has N channel transfer gates 114 and 116, the FIG. 4 embodiment has P channel transfer gates 122 and 124. More specifically, transfer gates 122 and 124 include PMOS field effect transistors 126 and 128, respectively. The gates of each transistor 126 and 128 is connected to control line 28 and receives a control signal therefrom. Unlike the embodiments of the invention shown in FIGS. 1, 2 and 3, the FIG. 4 embodiment has no inverter 34.

In operation, data transmission system 10 shown in FIG. 4 will receive a "high" control signal on control line 28 which will switch on transistors 22 and 24 allowing data buses 12 and 14 to be precharged through power supply terminals 26. During the precharge phase of operation, the "high" control signal on line 28 will be received by the gate of transistors 78 and 80. This will pull outputs 112 and 96 of transfer gates 124 and 122, respectively, to a low value which prevents transistors 76 and 74 from conducting. The "high" signal on line 28 will be received by the gates of PMOS transistors 128 and 126 preventing transfer gates 124 and 126 from conducting. Thus, circuit means 32 will remain inactive as long as the control signal on line 28 is "high".

When the control signal on line 28 goes "low", transistors 22 and 24 will switch off thereby isolating buses 12 and 14 from power supply terminal 26. Similarly, transistors 78 and 80 will switch off thereby isolating transfer gate outputs 112 and 96 from power supply terminal 30. At the same time, the "low" value on control line 28 turns on PMOS transistors 128 and 126 thereby placing circuit means 32 in an active mode. During this period if the Bus Logic pulls either bus 12 or 14 "low" through NMOS transistor 16 or 18, circuit means 32 will immediately pull the other bus "low". For example, if NMOS transistor 16 pulls bus 12 "low", inverter 66 will provide a "high" at output 88. This "high" at output 88 passes through transfer gate 122 and turns on transistor 74 thereby connecting bus 14 to power supply terminal 30 which is "low". Similarly, if NMOS transistor 18 pulls bus 14 "low", inverter 68 will provide a "high" at output 104 which passes through transfer gate 124, turning on transistor 76, and connecting bus 12 to power supply terminal 30.

It will be clear to those skilled in the art that the present invention is not limited to the specific embodiments shown and described herein. For example, the invention is not limited to the use of PMOS and NMOS field effect transistors but includes other switch means such as bipolar transistors. In addition, connections to the "gates" of MOS transistors are more generally considered to be "control electrodes".

In each of the embodiments described herein only two data buses are shown. However, the invention could clearly be extended to a plurality of buses. In addition, each of the buses is precharged to a first voltage level which in a preferred form is "high". However, by selectively replacing NMOS and PMOS transistors with PMOS and NMOS transistors, respectively, the present invention applies as well to precharging the buses to a first voltage level which is "low". In such case, pull up transistors would be attached to the buses and be responsive to the Bus Logic for placing a data signal at a second voltage level on the bus.

Numerous modifications, variations, and full and partial equivalents can be undertaken without departing from the invention as limited only by the spirit and scope of the appended claims.

What is claimed is:

1. A data transmission system comprising:
first and second buses;
first and second means attached to said first and second buses, respectively, for the transfer of data signals to said buses;
supply means connected to said buses for precharging said buses to a first voltage level; and circuit means connecting said buses and responsive to a data signal at a second voltage level on either of said buses for transferring said signal to the other bus.

2. The data transmission system of claim 1 further comprising a control line connected to said supply means, wherein said supply means is responsive to a first value of a digital control signal on said control line and said circuit means is responsive to a second value of said control signal on said control line.

3. The data transmission system of claim 2 further comprising:
first and second power supply terminals at said first and second voltage levels, respectively, wherein said supply means comprises switch means responsive to said control signal for connecting said first power supply terminal to said buses.

4. The data transmission system of claim 3 wherein said switch means comprise:
a first transistor connected between said first power supply terminal and said first bus; and
a second transistor connected between said first power supply terminal and said second bus, wherein the control electrode of each of said transistors is connected to said control line.

5. The data transmission system of claim 4 wherein said first and second transistors are NMOS field effect transistors.

6. The data transmission system of claim 3 wherein said circuit means comprises:
a NAND gate with first and second input lines connected to said first and second buses, respectively, and an output line for controlling the connection of said buses to said second power supply terminal when said data signal is at said second level and said control signal is at said second value.

7. The data transmission system of claim 6 further comprising a first inverter having an input line connected to said control line for receiving said control signal and an output line connected to said circuit means for providing a complementary control signal.

8. The data transmission system of claim 7 wherein said first inverter is a CMOS inverter which includes third and fourth series connected transistors with said third transistor being a PMOS field effect transistor and said fourth transistor being an NMOS field effect transistor.

9. The data transmission system of claim 7 wherein said circuit means further comprises:
a fifth transistor connecting said circuit means to said second power supply terminal; and
a sixth transistor connecting said circuit means to said second power supply terminal;
wherein the control electrode of each of said fifth and sixth transistors is connected to said output line of said first inverter.

10. The data transmission system of claim 9 wherein said fifth and sixth transistors are NMOS field effect transistors.

11. The data transmission system of claim 9 wherein said circuit means further comprises:
seventh and eighth transistors, said seventh transistor being connected between said first bus and said fifth transistor, said eighth transistor being connected between said second bus and said sixth transistor, and the control electrodes of said seventh and eight transistors being connected to said NAND gate output line.

12. The data transmission system of claim 11 wherein said seventh and eighth transistors are NMOS field effect transistors.

13. The data transmission system of claim 11 wherein said NAND gate includes ninth and tenth PMOS field effect transistors and eleventh and twelfth NMOS field effect transistors wherein:
said ninth transistor is connected between said first power supply terminal and said NAND gate output line with its gate connected to said first data bus;
said tenth transistor is connected between said first power supply and said NAND gate output line with its gate connected to said second data bus; and
said eleventh and twelfth transistors are series connected between said NAND gate output line and said second power supply terminal with the gate of said eleventh transistor being connected to said second data bus and the gate of said twelfth transistor being connected to said first data bus.

14. The data transmission system of claim 3 wherein said circuit means comprises:
a first inverter, a first transfer gate and a first transistor, wherein the input to said first inverter is connected to said first bus, the output of said first inverter is connected to the input of said first transfer gate, the output of said first transfer gate is connected to the control electrode of said first transistor and said first transistor is connected between said second bus and said second power supply terminal; and
a second inverter, a second transfer gate and a second transistor, wherein the input to said second inverter is connected to said second bus, the output of said second inverter is connected to the input of said second transfer gate, the output of said second transfer gate is connected to the control electrode of said second transistor, and said second transistor is connected between said first bus and said second power supply terminal.

15. The data transmission system of claim 14 wherein said first and second inverters are each CMOS inverters and wherein:
said first inverter includes a third PMOS field effect transistor and a fourth NMOS field effect transistor connected in series between said first and second power supply terminals; and
said second inverter includes a fifth PMOS field effect transistor and an sixth NMOS field effect transistor connected in series between said first and second power supply terminals.

16. The data transmission system of claim 14 wherein said circuit means further comprises third and fourth transistors wherein:
said third transistor is connected between the output of said first transfer gate and said second power supply terminal with its control electrode receiving said control signal; and
said fourth transistor is connected between the output of said second transfer gate and said second power supply terminal with its control electrode receiving said control signal.

17. The data transmission system of claim 16 wherein said third and fourth transistors are NMOS field effect transistors.

18. The data transmission system of claim 14 wherein each of said first and second transfer gates is a PN channel combination gate.

19. The data transmission system of claim 18 wherein:

said first transfer gate includes a third NMOS field effect transistor connected in parallel with a fourth PMOS field effect transistor;

said second transfer gate includes an fifth NMOS field effect transistor connected in parallel with a sixth PMOS field effect transistor;

the gates of said third and fifth transistors receive a complementary control signal; and the gates of said fourth and sixth transistors receive said control signal.

20. The data transmission system of claim 19 further comprising a third inverter having an input line for receiving said control signal and an output line for providing said complementary control signal, said input line being connected to said control line and said output line being connected to the gates of said third and fifth transistors.

21. The data transmission system of claim 20 wherein said third inverter is a CMOS inverter which includes seventh and eighth series connected transistors with said seventh transistor being a PMOS field effect transistor and said eighth transistor being an NMOS field effect transistor.

22. The data transmission system of claim 14 wherein each of said first and second transfer gates is an N channel gate.

23. The data transmission system of claim 22 wherein:
said first transfer gate includes a third transistor;
said second transfer gate includes a fourth transistor; and
the control electrodes of said third and fourth transistors receive a complementary control signal.

24. The data transmission system of claim 23 wherein said third and fourth transistors are NMOS field effect transistors.

25. The data transmission system of claim 23 further comprising a CMOS inverter having an input line for receiving said control signal and an output line for providing said complementary control signal, said output line being connected to the gates of said third and fourth transistors.

26. The data transmission system of claim 14 wherein each of said first and second transfer gates is a P channel gate.

27. The data transmission system of claim 26 wherein:
said first transfer gate includes a third transistor;
said second transfer gate includes a fourth transistor; and
the control electrodes of said third and fourth transistors receive said control signal.

28. The data transmission system of claim 27 wherein said third and fourth transistors are PMOS field effect transistors and the gates of said transistors are connected to said control line.

29. A data transmission system comprising:
a. first and second buses;
b. first and second means attached to said first and second buses, respectively, for the transfer of data signals to said buses;
c. first and second power supply terminals at said first and second voltage levels, respectively;
d. supply means for precharging said first and second buses to a first voltage level wherein said supply means comprises:
 i. a first NMOS field effect transistor connected between said first power supply terminal and said first bus; and ii. a second NMOS field effect transistor connected between said first power supply terminal and said second bus;

e. a control line connected to said supply means wherein said supply means is responsive to a first value of a digital control signal on said control line and said circuit means is responsive to a second value of said control signal on said control line, and wherein the gate of each of said first and second transistors is connected to said control line;

f. a first CMOS inverter having an input line connected to said control line for receiving said control signal and an output line connected to said circuit means for providing a complementary control signal; and g. circuit means responsive to a data signal at a second voltage level on either of said buses for transferring said signal to the other bus, said circuit means comprising:
 i. a NAND gate with first and second input lines connected to said first and second buses, respectively, and an output line for connecting said buses to said second power supply terminal when said data signal is at said second level and said control signal is at said second value, wherein said NAND gate includes third and fourth PMOS field effect transistors and fifth and sixth NMOS field effect transistors wherein:
  said third transistor is connected between said first power supply terminal and said NAND gate output line with its gate connected to said first data bus;
  said fourth transistor is connected between said first power supply and said NAND gate output line with its gate connected to said second data bus; and
  said fifth and sixth transistors are series connected between said NAND gate output line and said second power supply terminal with the gate of said fifth transistor being connected to said second data bus and the gate of said sixth transistor being connected to said first data bus;
 ii. seventh and eighth NMOS transistors connecting said circuit means to said second power supply terminal wherein the gate of each of said seventh and eighth transistors is connected to said output line of said first inverter;
 iii. ninth and tenth NMOS transistors, said ninth transistor being connected between said first bus and said seventh transistor, said tenth transistor being connected between said second bus and said eighth transistor, and the gates of said ninth and tenth transistors being connected to said NAND gate output line.

30. A data transmission system comprising:
a. first and second buses;
b. first and second means attached to said first and second buses, respectively, for the transfer of data signals to said buses;
c. first and second power supply terminals at said first and second voltage levels, respectively;
d. supply means for precharging said first and second buses to a first voltage level wherein said supply means comprises:
 i. a first NMOS field effect transistor connected between said first power supply terminal and said first bus; and ii. a second NMOS field effect transistor connected between said first power supply terminal and said second bus;
e. a control line connected to said supply means wherein said supply means is responsive to a first value of a digital control signal on said control line and said circuit means is responsive to a second value of said control signal on said control line, and wherein the gate of each of said first and second transistors is connected to said control line;
f. a first CMOS inverter having an input line connected to said control line for receiving said control signal and an output line connected to said circuit means for providing a complementary control signal; and
g. circuit means responsive to a data signal at a second voltage level on either of said buses for transferring said signal to the other bus, said circuit means comprising:
  i. a second inverter including a third PMOS field effect transistor and a fourth NMOS field effect transistor connected in series between said first and second power supply terminals;
  ii. a first transfer gate including a fifth NMOS field effect transistor connected in parallel with a sixth PMOS field effect transistor with the gate of said fifth transistor receiving a complementary control signal and the gate of said sixth transistor receiving said control signal;
  iii. a seventh transistor connected between said second bus and said second power supply terminal, wherein the input to said second inverter is connected to said first bus, the output of said second inverter is connected to the input of said first transfer gate, and the output of said first transfer gate is connected to the control electrode of said seventh transistor;
  iv. a third inverter including a eighth PMOS field effect transistor and an ninth NMOS field effect transistor connected in series between said first and second power supply terminals;
  v. a second transfer gate including a tenth NMOS field effect transistor connected in parallel with a eleventh PMOS field effect transistor with the gate of said tenth transistor receiving a complementary control signal and the gate of said eleventh transistor receiving said control signal;
  vi. a twelfth transistor connected between said first bus and said second power supply terminal, wherein the input to said third inverter is connected to said second bus, the output of said third inverter is connected to the input of said second transfer gate, and the output of said second transfer gate is connected to the control electrode of said twelfth transistor;
  vii. a thirteenth NMOS field effect transistor connected between the output of said first transfer gate and said second power supply terminal with its gate receiving said control signal; and
  viii. a fourteenth NMOS field effect transistor connected between the output of said second transfer gate and said second power supply terminal with its gate receiving said control signal.

31. A data transmission system comprising:
a. first and second buses;
b. first and second means attached to said first and second buses, respectively, for the transfer of data signals to said buses;
c. first and second power supply terminals at said first and second voltage levels, respectively;
d. supply means for precharging said first and second buses to a first voltage level wherein said supply means comprises:
  i. a first NMOS field effect transistor connected between said first power supply terminal and said first bus; and
  ii. a second NMOS field effect transistor connected between said first power supply terminal and said second bus;
e. a control line connected to said supply means wherein said supply means is responsive to a first value of a digital control signal on said control line and said circuit means is responsive to a second value of said control signal on said control line, and wherein the gate of each of said first and second transistors is connected to said control line;
f. a first CMOS inverter having an input line connected to said control line for receiving said control signal and an output line connected to said circuit means for providing a complementary control signal; and
g. circuit means responsive to a data signal at a second voltage level on either of said buses for transferring said signal to the other bus, said circuit means comprising:
  i. a second inverter including a third PMOS field effect transistor and a fourth NMOS field effect transistor connected in series between said first and second power supply terminals;
  ii. a first transfer gate including a fifth NMOS field effect transistor with its gate receiving a complementary control signal;
  iii. a sixth transistor connected between said second bus and said second power supply terminal, wherein the input to said second inverter is connected to said first bus, the output of said second inverter is connected to the input of said first transfer gate, and the output of said first transfer gate is connected to the control electrode of said sixth transistor;
  iv. a third inverter including a seventh PMOS field effect transistor and an eighth NMOS field effect transistor connected in series between said first and second power supply terminals;
  v. a second transfer gate including a ninth NMOS field effect transistor with its gate receiving a complementary control signal;
  vi. a tenth transistor connected between said first bus and said second power supply terminal, wherein the input to said third inverter is connected to said second bus, the output of said third inverter is connected to the input of said second transfer gate, and the output of said second transfer gate is connected to the control electrode of said tenth transistor;
  vii. a eleventh NMOS field effect transistor connected between the output of said first transfer gate and said second power supply terminal with its gate receiving said control signal; and
  viii. a twelfth NMOS field effect transistor connected between the output of said second transfer gate and said second power supply terminal with its gate receiving said control signal.

32. A data transmission system comprising:
a. first and second buses;
b. first and second means attached to said first and second buses, respectively, for the transfer of data signals to said buses;

c. first and second power supply terminals at said first and second voltage levels, respectively;
d. supply means for precharging said first and second buses to a first voltage level wherein said supply means comprises:
  i. a first NMOS field effect transistor connected between said first power supply terminal and said first bus; and
  ii. a second NMOS field effect transistor connected between said first power supply terminal and said second bus;
e. a control line connected to said supply means wherein said supply means is responsive to a first value of a digital control signal on said control line and said circuit means is responsive to a second value of said control signal on said control line, and wherein the gate of each of said first and second transistors is connected to said control line; and
f. circuit means responsive to a data signal at a second voltage level on either of said buses for transferring said signal to the other bus, said circuit means comprising:
  i. a second inverter including a third PMOS field effect transistor and a fourth NMOS field effect transistor connected in series between said first and second power supply terminals;
  ii. a first transfer gate including a fifth PMOS field effect transistor with its gate receiving said control signal;
  iii. a sixth transistor connected between said second bus and said second power supply terminal, wherein the input to said second inverter is connected to said first bus, the output of said second inverter is connected to the input of said first transfer gate, and the output of said first transfer gate is connected to the control electrode of said sixth transistor;
  iv. a third inverter including a seventh PMOS field effect transistor and an eighth NMOS field effect transistor connected in series between said first and second power supply terminals;
  v. a second transfer gate including a ninth PMOS field effect transistor with its gate receiving said control signal;
  vi. a tenth transistor connected between said first bus and said second power supply terminal, wherein the input to said third inverter is connected to said second bus, the output of said third inverter is connected to the input of said second transfer gate, and the output of said second transfer gate is connected to the control electrode of said tenth transistor;
  vii. a eleventh NMOS field effect transistor connected between the output of said first transfer gate and said second power supply terminal with its gate receiving said control signal; and
  viii. a twelfth NMOS field effect transistor connected between the output of said second transfer gate and said second power supply terminal with its gate receiving said control signal.

33. The data transmission system according to claims 1, 29, 30, 31 or 32 wherein said first voltage level is high relative to said second voltage level.

* * * * *

REEXAMINATION CERTIFICATE (2031st)

United States Patent [19]

Milby et al.

[11] B1 4,918,329

[45] Certificate Issued Jun. 1, 1993

[54] DATA TRANSMISSION SYSTEM

[75] Inventors: Gregory H. Milby, San Diego; Ikuo J. Sanwo, San Marcos, both of Calif.

[73] Assignee: NCR Corporation, Dayton, Ohio

Reexamination Request:
No. 90/002,558, Feb. 18, 1992

Reexamination Certificate for:
Patent No.: 4,918,329
Issued: Jul. 25, 1988
Appl. No.: 224,023
Filed: Apr. 17, 1990

[51] Int. Cl.$^5$ .............. H03K 19/17; H03K 19/96; G06F 13/00; G11C 15/49
[52] U.S. Cl. ..................... 307/241; 307/443; 370/99; 370/85.9; 364/200; 365/189.01
[58] Field of Search ............. 307/241, 443, 475, 449, 307/443, 279, 242, 448, 453, 468, 572; 370/85.1; 365/203

[56] References Cited

U.S. PATENT DOCUMENTS

| | | | |
|---|---|---|---|
| 3,769,525 | 10/1973 | Foss et al. | 307/241 |
| 4,527,237 | 7/1985 | Frieder et al. | 364/200 |
| 4,621,202 | 11/1986 | Pumo | 307/572 |
| 4,774,422 | 9/1988 | Donaldson et al. | 307/475 |
| 4,883,989 | 11/1989 | Mizukami | 307/475 |
| 5,004,937 | 4/1991 | de Oliveira et al. | 307/443 |

*Primary Examiner*—Timothy P. Callahan

[57] ABSTRACT

A data transmission system for transferring data signals between first and second buses is disclosed. The system includes means attached to the buses for the transfer of data signals to the buses and supply means connected to the buses for precharging the buses to a first voltage level. The system also includes circuit means connecting the buses and responsive to a data signal at a second voltage level on either of said buses for transferring the signal to the other bus.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14-28, 31, and 32 is confirmed.

Claims 1-13, 29 and 33 are cancelled.

Claim 30 is determined to be patentable as amended.

30. A data transmission system comprising:
a. first and second buses;
b. first and second means attached to said first and second buses, respectively, for the transfer of data signals to said buses;
c. first and second power supply terminals at said first and second voltage levels, respectively;
d. supply means for precharging said first and second buses to a first voltage level wherein said supply means comprises:
   i. a first NMOS field effect transistor connected between said first power supply terminal and said first bus; and
   ii. a second NMOS field effect transistor connected between said first power supply terminal and said second bus;
e. a control line connected to said supply means wherein said supply means is responsive to a first value of a digital control signal on said control line, and wherein the gate of each of said first and second transistors is connected to said control line;
f. a first CMOS inverter having an input line connected to said control line for receiving said control signal and an output line connected to said circuit means for providing a complementary control signal; and
g. circuit means responsive to a data signal at a second voltage level on either of said buses for transferring said signal to the other bus, and said circuit means is responsive to a second value of said control signal on said control line, said circuit means comprising:
   i. a second inverter including a third PMOS field effect transistor and a fourth NMOS field effect transistor connected in series between said first and second power supply terminals;
   ii. a first transfer gate including a fifth NMOS field effect transistor connected in parallel with a sixth PMOS field effect transistor with the gate of said fifth transistor receiving a complementary control signal and the gate of said sixth transistor receiving said control signal;
   iii. a seventh transistor connected between said second bus and said second power supply terminal, wherein the input to said second inverter is connected to said first bus, the output of said second inverter is connected to the input of said first transfer gate, and the output of said first transfer gate is connected to the control electrode of said seventh transistor;
   iv. a third inverter including [a] *an* eighth PMOS field effect transistor and [an] *a* ninth NMOS field effect transistor connected in series between said first and second power supply terminals;
   v. a second transfer gate including a tenth NMOS field effect transistor connected in parallel with [a] *an* eleventh PMOS field effect transistor with the gate of said tenth transistor receiving a complementary control signal and the gate of said eleventh transistor receiving said control signal;
   vi. a twelfth transistor connected between said first bus and said second power supply terminal, wherein the input to said third inverter is connected to said second bus, the output of said third inverter is connected to the input of said second transfer gate, and the output of said second transfer gate is connected to the control electrode of said twelfth transistor;
   vii. a thirteenth NMOS field effect transistor connected between the output of said first transfer gate and said second power supply terminal with its gate receiving said control signal; and
   viii. a fourteenth NMOS field effect transistor connected between the output of said second transfer gate and said second power supply terminal with its gate receiving said control signal.

* * * * *